United States Patent [19]

Prete

[11] Patent Number: 5,273,363

[45] Date of Patent: Dec. 28, 1993

[54] ROLLER FOR SLIDING WINDOWS AND DOORS

[75] Inventor: James G. Prete, Hinsdale, Ill.

[73] Assignee: Ashland Products, Inc., Chicago, Ill.

[21] Appl. No.: 763,902

[22] Filed: Sep. 23, 1991

[51] Int. Cl.$^5$ .............................................. F16C 29/00
[52] U.S. Cl. ...................................... 384/7; 384/42; 384/45
[58] Field of Search .............. 384/7, 43, 44, 45, 42, 384/54, 50; 160/201

[56] References Cited

U.S. PATENT DOCUMENTS

| | | | |
|---|---|---|---|
| 3,120,033 | 6/1966 | Steele, Jr. | 160/201 |
| 3,219,398 | 11/1965 | Anderson | 384/44 |
| 3,255,807 | 6/1966 | Andres | 20/19 |
| 3,410,614 | 11/1968 | Shaw | 384/44 |
| 4,004,372 | 1/1977 | Beard et al. | 49/404 |
| 4,149,615 | 4/1979 | Kappenhagen | 187/52 R |
| 4,272,923 | 6/1981 | Anderson | 49/360 |
| 4,330,960 | 5/1982 | Hasemann et al. | 49/404 |
| 4,452,014 | 6/1984 | Markus | 49/360 |
| 4,674,231 | 6/1987 | Radek et al. | 49/118 |
| 4,912,807 | 4/1990 | Futch et al. | 16/90 |

*Primary Examiner*—Lenard A. Footland
*Attorney, Agent, or Firm*—Wallenstein, Wagner & Hattis, Ltd.

[57] ABSTRACT

A roller for a window or door slidably mounted on a track is disclosed. The roller comprises a housing having first and second opposing walls and a shelf having a convex outer surface and extending between the first and second walls. A belt encircles the shelf. The belt has an inner surface having a low coefficient of friction for sliding engagement with the convex surface of the shelf. The belt further has an outer surface having a high coefficient of friction adapted for non-sliding engagement with the track.

20 Claims, 1 Drawing Sheet

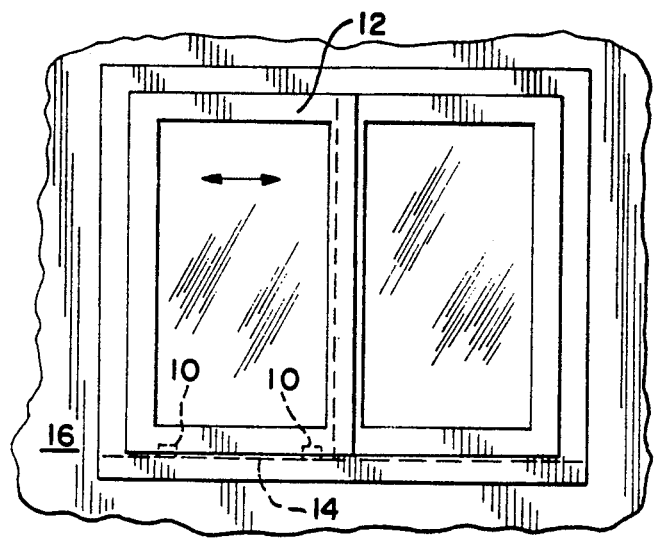
FIG. 1
FIG. 2
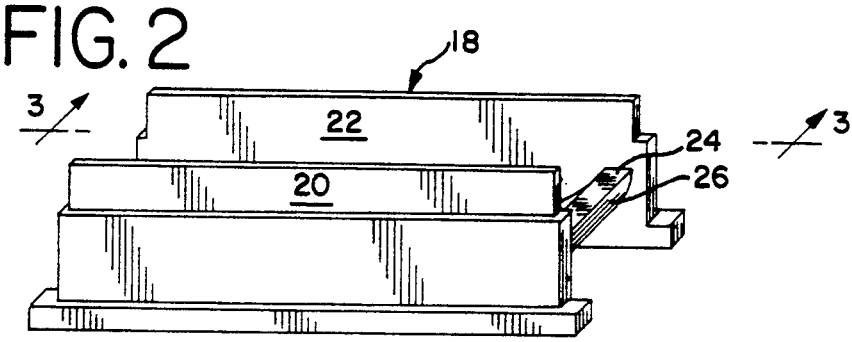
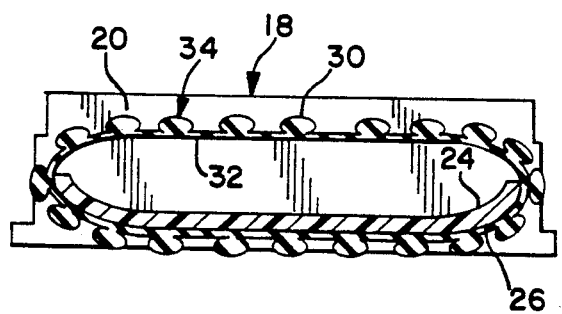
FIG. 3
FIG. 4
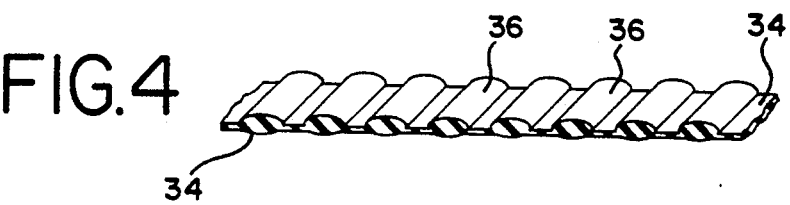

ROLLER FOR SLIDING WINDOWS AND DOORS

1. Technical Field

The invention relates to sliding windows and doors, and more particularly to a roller for slidably supporting the window or door on a track.

2. Background Prior Art

Laterally sliding windows, including such windows which are commonly referred to as sliding doors, are well known. To ease movement of sliding glass windows, wheeled rollers have been provided on the base of the window which roll on a track. Prior art rollers have typically comprised either one or a pair of wheels, each rotatable about a respective axle, and secured within a housing. Because the window is large relative to the size of the wheels and axles, a relatively large load is imposed on the relatively small wheels and axles.

The window load often presented greater friction between the axle and the housing than between the wheel and the surface of the track. This prevented the wheels from actually rotating, causing the wheels to slide, and often screech, along the track surface as one operated the window. Additionally, even if the wheels did rotate, in the case of plastic wheels, axles and/or housings, the rotation of the axle against the housing could generate enough frictional heat to weld the axle and housing together.

The present invention is provided to solve these and other problems.

SUMMARY OF THE INVENTION

It is an object of the invention to provide a roller for a window slidably mounted on a track.

In accordance with the invention, the roller comprises a housing having first and second opposing walls and a shelf having a convex outer surface and extending between the first and second walls. A belt encircles the shelf. The belt has an inner surface having a low coefficient of friction for sliding engagement with the convex surface of the shelf. The belt further has an outer surface having a high coefficient of friction adapted for non-sliding engagement with the track. The belt is two-ply, having an inner surface of a low friction material, such as polyethylene, and an outer, ribbed surface of a rubber-like material.

Other features and advantages of the invention will be apparent from the following specification taken in conjunction with the following drawing.

BRIEF DESCRIPTION OF DRAWINGS

FIG. 1 is an elevation of a sliding window utilizing the roller of the present invention;

FIG. 2 is a perspective view of the roller of FIG. 1;

FIG. 3 is a sectional view taken along line 3—3 of FIG. 2; and

FIG. 4 is a perspective view of a section of a belt in accordance with the invention.

DETAILED DESCRIPTION

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

A roller 10 for a window 12 slidably mounted on a track 14 in a wall 16 is illustrated in FIG. 1. In the disclosed embodiment, two of the rollers 10 are shown. For larger ones of the windows 12, additional ones of the rollers 10 may be utilized, as needed.

Referring to FIGS. 2 and 3, the roller 10 comprises a housing 18 having integral first and second opposing walls, 20, 22, respectively, and an integral shelf 24 having a smooth convex outer surface 26. The shelf 24 extends between the first wall 20 and the second wall 22. The housing 18 is formed of a plastic, such as nylon. A belt 30 encircles the shelf 24.

The belt 30 is illustrated in greater detail in FIG. 4. The belt is two-ply, having an inner ply and an outer ply. The inner ply forms an inner surface 32 having a low coefficient of friction for sliding engagement with the convex surface 26 of the shelf 24. The outer ply forms an outer surface 34 having a high coefficient of friction adapted for non-sliding engagement with the track 14. In the preferred embodiment, the inner ply is polyethylene and the outer ply is an extruded, rubber-like material, such as Sanoprene ®, distributed by Monsanto Corp. To enhance the frictional coefficient of the outer surface 34, the outer ply is provided with a plurality of transverse ribs 36. Dimensions shown on the drawings are for a standard size window. Larger dimensions are contemplated when the roller 10 is to be used with large windows or sliding glass doors.

The belt 30 of desired width can be obtained by cutting narrow loops from an extruded tube, such as a commercially available timing belt, distributed by Teel Plastics of Baraboo, Wis.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A roller for a window or door slidably, mounted on a track, said roller comprising:
   a housing having first and second opposing walls;
   a shelf disposed between said first and second walls; and
   a belt encircling said shelf and having a surface adapted for engagement with said track.

2. The roller of claim 1 wherein said shelf extends from said first wall to said second wall.

3. The roller of claim 1 wherein said belt has an inner surface having a relatively low coefficient of friction.

4. The roller of claim 3 wherein said belt inner surface is polyethylene.

5. The roller of claim 1 wherein said belt has an outer surface having a relatively high coefficient of friction.

6. The roller of claim 5 wherein said belt outer surface is ribbed.

7. The roller of claim 6 wherein said ribs extend transverse to the direction of said belt.

8. The roller of claim 5 wherein said belt outer surface is formed of a rubber-like material.

9. The roller of claim 8 wherein said rubber-like material comprises Sanoprene ®.

10. The roller of claim 1 wherein said housing is formed of nylon.

11. A roller for a window or door slidably mounted on a track, said roller comprising:
- a housing having first and second opposing walls;
- a shelf extending between said first and second walls; and
- a belt encircling said shelf, said belt having an inner surface having a low coefficient of friction for sliding engagement with said shelf and having an outer surface having a high coefficient of friction adapted for non-sliding engagement with said track.

12. The roller of claim 11 wherein said belt inner surface is polyethylene.

13. The roller of claim 11 wherein said belt outer surface contains a plurality of ribs formed of a rubber-like material.

14. The roller of claim 13 wherein said ribs extend transverse to the direction of said belt.

15. The roller of claim 14 wherein said rubber-like material comprises Sanoprene ®.

16. A roller for a window or door slidably mounted on a track, said roller comprising:
- a housing having first and second opposing walls;
- a shelf integrally having a convex outer surface and extending between said first and second walls; and
- a belt encircling said shelf, said belt having an inner surface having a low coefficient of friction for sliding engagement with said convex surface of said shelf and having an outer surface having a high coefficient of friction adapted for non-sliding engagement with said track.

17. The roller of claim 16 wherein said belt is two-ply having an inner surface of mylar and an outer surface of a rubber-like material.

18. The roller of claim 17 wherein said outer surface is ribbed.

19. The roller of claim 18 wherein said ribs extend transverse to the direction of said belt.

20. The roller of claim 17 wherein said rubber-like material comprises Sanoprene ®.

* * * * *